(12) United States Patent
Lango et al.

(10) Patent No.: US 9,578,064 B2
(45) Date of Patent: *Feb. 21, 2017

(54) AUTOMATIC TUNING OF VIRTUAL DATA CENTER RESOURCE UTILIZATION POLICIES

(71) Applicant: BRACKET COMPUTING, INC., Sunnyvale, CA (US)

(72) Inventors: Jason A. Lango, Mountain View, CA (US); John K. Edwards, Sunnyvale, CA (US); Nitin Muppalaneni, Los Altos, CA (US)

(73) Assignee: Bracket Computing, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/085,736

(22) Filed: Mar. 30, 2016

(65) Prior Publication Data

US 2016/0212176 A1  Jul. 21, 2016

Related U.S. Application Data

(63) Continuation of application No. 13/837,456, filed on Mar. 15, 2013, now Pat. No. 9,306,978.

(51) Int. Cl.
*H04L 12/24* (2006.01)
*H04L 29/06* (2006.01)
(Continued)

(52) U.S. Cl.
CPC ............. *H04L 63/20* (2013.01); *G06F 3/0605* (2013.01); *G06F 3/067* (2013.01); *G06F 3/0631* (2013.01);
(Continued)

(58) Field of Classification Search
CPC ...... H04L 63/20; H04L 47/70; H04L 41/5019; H04L 41/5096; H04L 67/1097; G06F 17/30306; G06F 17/30233; G06F 17/30; G06F 3/067; G06F 3/0631; G06F 3/0605
(Continued)

(56) References Cited

U.S. PATENT DOCUMENTS

2004/0243699 A1* 12/2004 Koclanes ................ H04L 29/06
709/224
2005/0004929 A1* 1/2005 Stephenson ............... G06F 8/65
(Continued)

OTHER PUBLICATIONS

Alessio Gambi et al, SLA Protection Models for Virtualized Data Centers, IEEE, 2009.*
(Continued)

*Primary Examiner* — Shanto M Abedin
(74) *Attorney, Agent, or Firm* — Hickman Palermo Becker Bingham LLP

(57) ABSTRACT

A computer-implemented process receives a request to utilize one or more virtual data center (VDC) resources at a virtual data center and determines a particular service level applicable to request. Based on the particular service level and mapping information that indicates associations between VDC resource utilization policies and service levels, the process determines a particular VDC resource utilization policy corresponding to the request and causes completion of the request according to the particular VDC resource utilization policy. Another process determines that a resource utilization performance is incompatible with a requested service level and selects a new resource utilization based in part on the resource utilization performance information and mapping information. The process causes data distributed according to a prior resource utilization policy to be distributed according to the new resource utilization policy in one or more resources at a virtual data center.

18 Claims, 6 Drawing Sheets

(51) Int. Cl.
 *G06F 17/00* (2006.01)
 *G06F 17/30* (2006.01)
 *H04L 29/08* (2006.01)
 *G06F 3/06* (2006.01)
 *H04L 12/911* (2013.01)

(52) U.S. Cl.
 CPC ......... *G06F 17/30* (2013.01); *G06F 17/30233* (2013.01); *G06F 17/30306* (2013.01); *H04L 41/5019* (2013.01); *H04L 41/5096* (2013.01); *H04L 47/70* (2013.01); *H04L 67/1097* (2013.01)

(58) Field of Classification Search
 USPC ............................................................ 726/1
 See application file for complete search history.

(56) References Cited

U.S. PATENT DOCUMENTS

| | | | |
|---|---|---|---|
| 2005/0195660 A1* | 9/2005 | Kavuri | G06F 3/0605 365/189.05 |
| 2007/0067435 A1* | 3/2007 | Landis | G06F 9/5016 709/224 |
| 2010/0058347 A1* | 3/2010 | Smith | G06F 9/50 718/104 |
| 2011/0125894 A1 | 5/2011 | Anderson et al. | |
| 2011/0264805 A1* | 10/2011 | Breitgand | G06F 9/45558 709/226 |
| 2012/0054763 A1* | 3/2012 | Srinivasan | G06F 9/5005 718/104 |
| 2014/0068703 A1 | 3/2014 | Balus et al. | |
| 2014/0089500 A1 | 3/2014 | Sankar et al. | |
| 2014/0095691 A1* | 4/2014 | Ganguli | H04L 41/5025 709/224 |
| 2014/0282824 A1 | 9/2014 | Lango | |

OTHER PUBLICATIONS

European Patent Office, "Search Report" in application No. PCT/US2014/023816, dated Jul. 11, 2014, 8 pages.

Claims in European Application No. PCT/2014/023816, dated Jul. 2014, 9 pages.

U.S. Appl. No. 13/837,456, filed Mar. 15, 2013, Office Action, Jan. 21, 2015.

U.S. Appl. No. 13/837,456, filed Mar. 15, 2013, Notice of Allowance, Nov. 5, 2015.

U.S. Appl. No. 13/837,456, filed Mar. 15, 2013, Final Office Action, Jun. 23, 2015.

\* cited by examiner

AUTOMATIC TUNING OF VIRTUAL DATA CENTER RESOURCE UTILIZATION POLICIES

BENEFIT CLAIM

This application claims the benefit under 35 USC §120 as a continuation of application Ser. No. 13/837,456, filed Mar. 15, 2013, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present disclosure generally relates to data storage policies using configurations such as RAID, and relates more specifically to techniques for the utilization of virtual data center (VDC) resources.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many enterprises and their computer systems utilize resources that are hosted by a virtual data center and are accessible through the internet, such as cloud storage, cloud computing, or cloud databases. In this arrangement, the enterprise is a client of a virtual data center (VDC). Such virtual data centers may provide a client with many benefits, including reduced costs, easier scalability, and a reduced administrative burden. However, a drawback of utilizing such VDC resources is that the performance qualities of the resources can change over time. For example, there may be significant variation in the time needed to complete a read operation or a write operation. The variance in quality can impact the operation of various client applications that rely on the resources of the virtual data center. Approaches for cost-effectively obtaining consistent performance from cloud storage units are needed.

Additionally, client needs for performance quality may also change over time. For example, the VDC may quantify the performance of its storage units according to redundant array of independent disks (RAID) levels and may establish a first level of RAID configuration or performance, or other data storage policies, for particular data storage units that are assigned to the client, but over time the client may determine that it needs different levels of RAID configuration or performance, or other data storage policies, to fulfill its needs. Adjustment of these policies is typically complicated, requires manual communication between the client and the VDC, and may be disruptive to data storage operations. One approach for meeting service level objectives is to overprovision the resources needed. However, these approaches require high levels of intellectual and capital investment. Approaches for accommodating the changing needs of the client while minimizing costs to the client are needed.

SUMMARY OF THE INVENTION

The appended claims may serve as a summary of the invention.

DESCRIPTION OF EXAMPLE EMBODIMENTS

Figure 1:
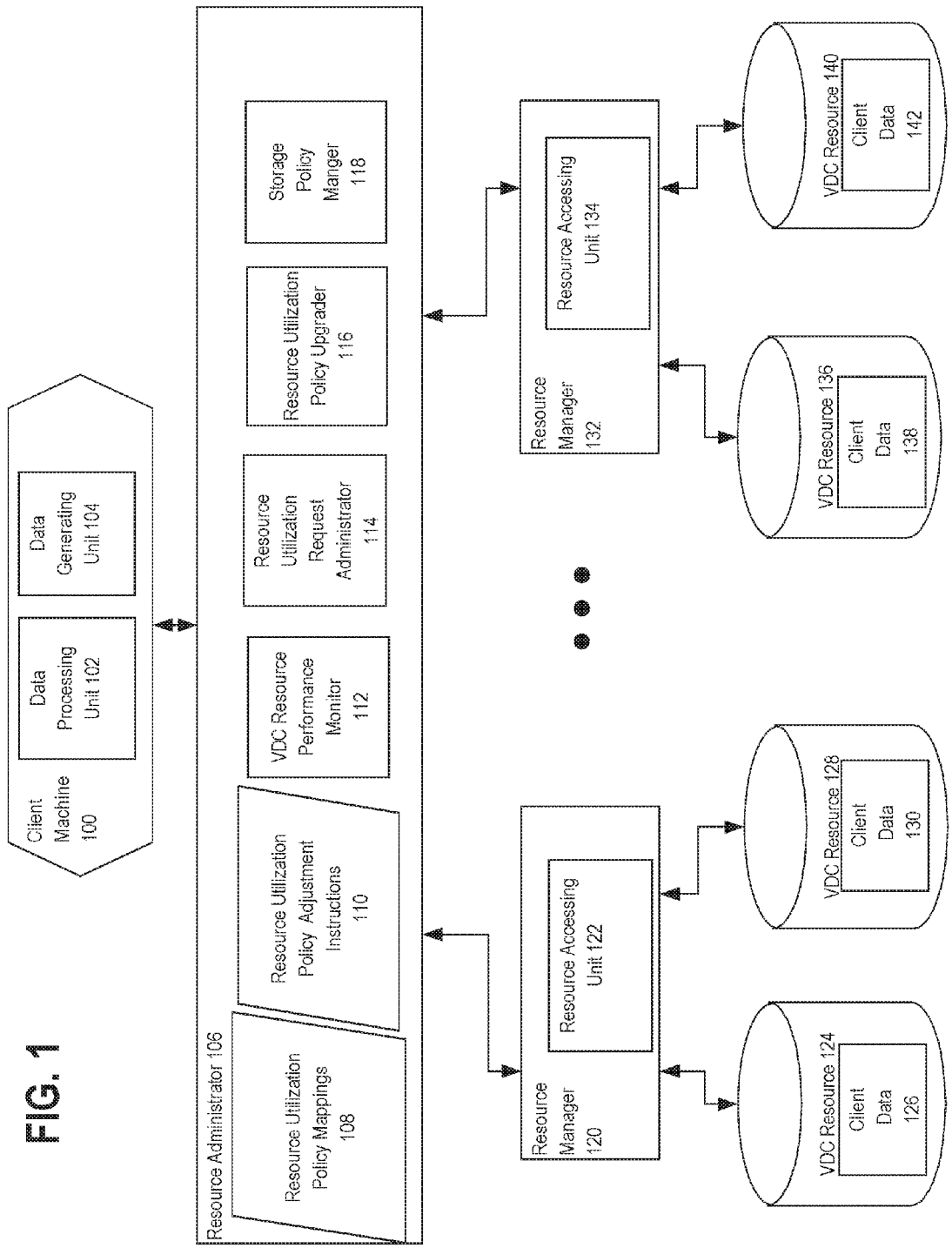
FIG. 1 illustrates an example networked computer system arrangement that may be used to implement an embodiment.

Methods for automatically tuning virtual data center resource utilization policies are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives

1.0 General Overview

Embodiments may be used in a networked computer system having a storage administrator computer, a plurality of computer-based storage units, and a client computer or machine. In this context, a virtual data center or VDC refers to any of one or more virtualized enterprise computer systems, virtual machine infrastructure in a private data center, computing, storage or networking resources in a private cloud, resources in a public cloud such as that offered by a cloud service provider (CSP), and hybrid cloud computing environments.

In an embodiment, a client specifies expected service levels for the client's workload and related infrastructure services that utilize VDC resources and managed by a resource administrator separate from the VDC provider. The resource administrator ensures that resource utilization requests are completed according to a level of performance corresponding to the specified service levels. The client may change the specified service levels during operation and the resource administrator may ensure that resource utilization requests are completed according to a level of performance corresponding to the modified service level specifications. The logic of the resource administrator may be controlled by a different entity than the virtual data center that provides the VDC resources.

The resource administrator may automatically cause incoming resource utilization requests to be completed according to a policy that is determined at the time the resource utilization request is received. The resource administrator may determine the appropriate policy based on mappings of policies to service levels, which the resource administrator modifies as performance of the VDC resources change.

In a context where the VDC resources are storage units, the resource administrator may cause data stored in the storage units to be stored according to a different storage policy in response to a client requesting a different service level or a determined change in performance of the VDC storage units. Examples of different storage policies include changing data redundancy, mirroring or replication levels, data storage performance requirements, data storage striping policies (bit level, byte level, block level) changing from one RAID level to a different RAID level or selecting an alternative to RAID such as a particular erasure coding, or any other parameter relating to the reliability, availability, performance and capacity of a storage unit.

In an embodiment, a computer-implemented process includes receiving a request to utilize one or more virtual data center (VDC) resources at a virtual data center. In response to receiving the request, the process determines a particular service level applicable to request. The process determines, based on the particular service level and mapping information that indicates associations between VDC resource utilization policies and service levels, a particular VDC resource utilization policy corresponding to the request. The process causes completion of the request according to the particular VDC resource utilization policy.

In an embodiment, the process includes determining, based on an analysis of a performance of a set of VDC resources, that a prior VDC resource utilization policy associated with a certain service level is no longer compatible with a performance expectation associated with the certain service level. The process also includes modifying the mapping information to replace an identification of an association between the prior VDC resource utilization policy and the certain service level with an identification of an association between a new resource utilization policy and the certain service level.

2.0 Structural and Functional Overview

FIG. 1 illustrates an example networked computer system arrangement that may be used to implement an embodiment. For purposes of illustrating clear examples, FIG. 1 shows a representative number of various functional elements that may be used in an embodiment; however, other embodiments may use any number of such functional elements and therefore FIG. 1 is intended as merely one possible implementation example. Client machine 100 comprises data processing unit 102, which may process data retrieved from VDC resources remote to the client machine, and data generating unit 104, which may generate data that is sent to VDC resources remote to the client machine.

Client machine 100 may be communicatively coupled to resource administrator 106. Resource administrator 106 may be communicatively coupled to one or more resource managers, which may each be communicatively coupled to one or more VDC resources. Such a system may be utilized when client machine 100 sends resource utilization requests, such as request to store data at, or retrieve data from, VDC storage units.

Client machine 100 may send data to, or receive data from, resource administrator 106 using any of a variety of communication protocols including, but not limited, to the Internet Small Computer System Interface (iSCSI) protocol.

Resource administrator 106 represents computers, programs, processes, or other logical elements for managing requests to utilize VDC resources 124, 128, 136, 140. VDC resources 124, 128, 136, 140 may be virtualized storage units hosted by one or more virtual data centers, database resources, computing resources provided by a VDC, or other VDC resources. VDC resources 124, 128, 136, 140 may each be located at different physical host machines.

Resource administrator 106 may be remote from client machine 100 and client machine 100 may communicate with resource administrator 106 through one or more networks of different types, such as one or more local area networks, wide area networks, internetworks, or internets.

Resource administrator 106 comprises resource utilization policy mappings 108, resource utilization policy adjustment instructions 110, VDC resource performance monitor 112, storage policy manager 118, resource utilization request administrator 114, and resource utilization policy upgrader 116. Resource utilization policy mappings 108 may identify associations between resource utilization policies and service levels. Resource utilization policies may include storage policies, computing resource policies, database resource policies, or other types of policies relating to the utilization of VDC resources.

Resource utilization policy adjustment instructions 110 may comprise instructions for modifying resource utilization policy mappings 108. Resource utilization request administrator 114 may direct incoming data operation requests to the appropriate VDC resource managers or VDC resources. VDC resource performance monitor 112 may monitor the performance of one or more VDC resources. Resource utilization policy upgrader 116 may update resource utilization policy mappings 108 according to resource utilization policy adjustment instructions 110 and based on an analysis of VDC resource performance. Storage policy manager 118 may cause the data of client machine 100 to be stored according to a new storage policy based on determined performance information.

Resource administrator 106 may be communicatively coupled to one or VDC resource managers, such as resource managers 120 and 132. Each of resource managers 120, 132 may be communicatively coupled to one or more VDC resources, such as VDC resources 124, 128, 136, 140. In an embodiment, resource administrator 106 communicates directly with VDC resources 124, 128, 136, 140, rather than communicating through a resource manager.

In some embodiments, resource managers 120 and 132 comprise resource accessing units. Resource accessing unit 122 may send information to, or receive information from, VDC resources 124, 128, which are both communicatively coupled to resource manager 120. Similarly, resource accessing unit 134 may send information to, or receive information from, VDC resources 136, 140, which are both communicatively coupled to resource manager 132.

VDC resources 124, 128, 136, 140 may comprise data associated with client machine 100, such as client data 126, 130, 138, 142. Client machine 100 may read data from, or write data to, VDC resources 124, 128, 136, 140 by sending the read or write request to resource administrator 106. VDC resources may be storage units, computing resources, or database resources, or other VDC resources, according to various embodiments.

Resource administrator 106 may receive VDC resource utilization requests from a plurality of different clients, such as client machine 100, and may be communicatively coupled with a plurality of different VDC resources, either directly or indirectly through resource managers. Resources of some VDCs may store or process data associated with a particular client and other VDC resources may store or process data associated with a different client.

Communications between resource administrator 106, resource managers 120, 132, and/or VDC resources 124, 128, 136, 140 may occur through any of a variety of networks, such as one or more local area networks, wide area networks, internetworks, or internets.

Figure 2:
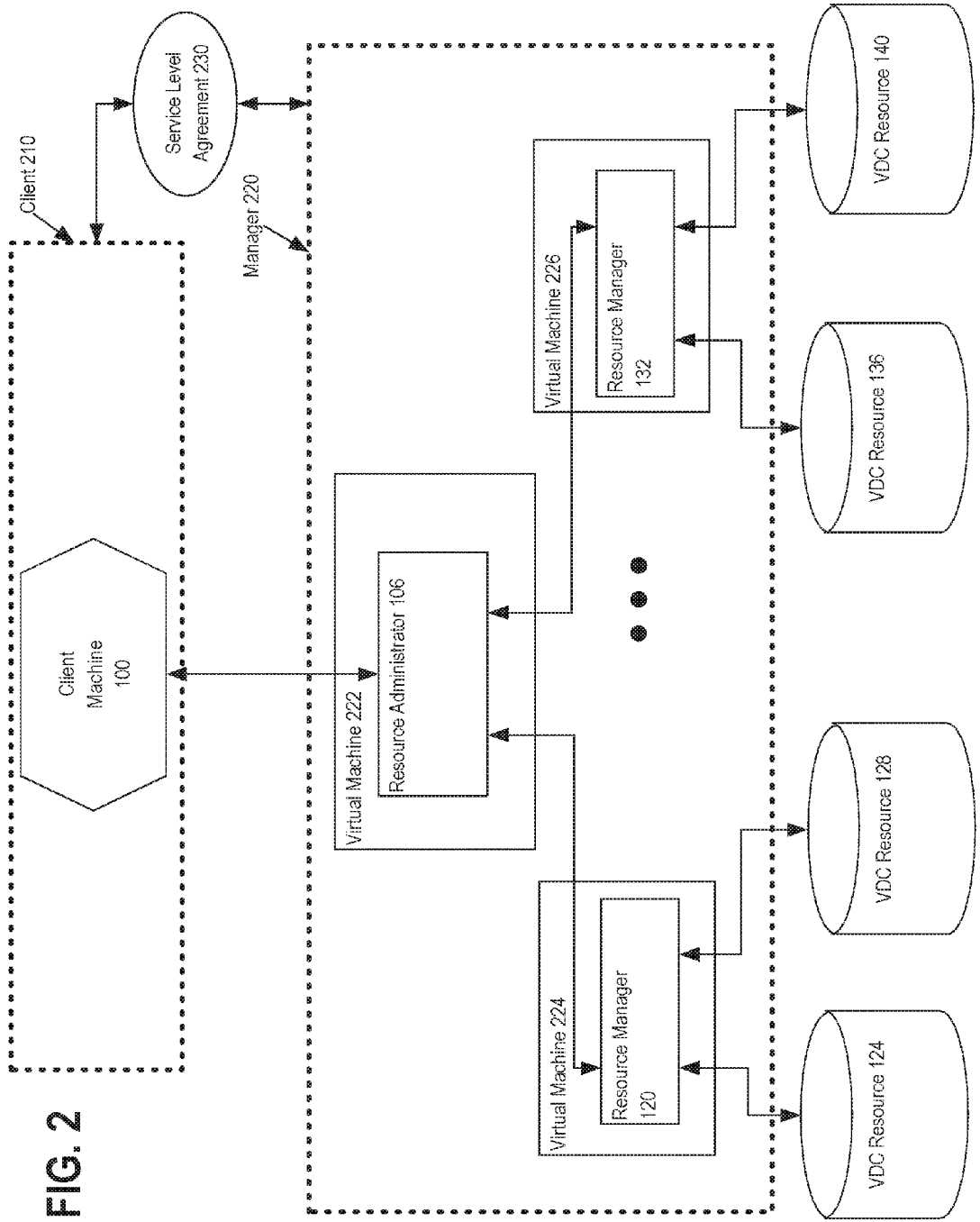
FIG. 2 illustrates a context of the example networked computer system arrangement according to an embodiment.

FIG. 2 illustrates an example context of the example networked computer system arrangement of FIG. 1, according to an embodiment. Client machine 100 may be controlled by client 210 and the logic of resource administrator 106 and resource managers 120 and 132 may be controlled by manager 220.

Manager 220 may be different from the virtual data center(s) that hosts VDC resources 124, 128, 136, 140 and different from client 210, which may utilize data stored in, or computed at, VDC resources 124, 128, 136, 140. Manager 220 may control and manage VDC resources 124, 128, 136, 140 on behalf of client 210, according to the methods described herein.

Resource administrator 106 may operate within virtual machine 222, resource manager 120 may operate within a separate virtual machine 224, and resource manager 132 may operate within a separate virtual machine 226. In an embodiment, virtual machine 222, 224, and 226 are hosted by the same virtual data center provider that hosts one or more of VDC resources 124, 128, 136, 140. Manager 220 may control the execution of processes within virtual machines 222, 224, 226, such as the logic of resource administrator 106, resource manager 120, and resource manager 132.

In some embodiments, resource administrator 106 accesses VDC resources 124, 128, 136, 140 directly, without requesting resource manager 120 or 132 to access VDC resources 124, 128, 136, 140. However, in some embodiments, one or more virtual data centers, which host VDC resources 124, 128, 136, 140, restrict the number of VDC resources that may be connected to a single virtual machine to be less than a particular number. For example, some VDCs limit the number of virtual disks that may be accessed by a particular virtual machine. In such an embodiment, a system as illustrated in FIGS. 1 and 2 may allow resource administrator 106 to maximize the number of VDC resources that can be controlled by the resource administrator. Resource administrator 106 may manage VDC resources 124, 128, 136, 140 by requesting modules of a plurality of different virtual machines, such as resource managers 120 and 132 at virtual machines 224 and 226, to perform various resource utilization operations or provide necessary performance information. Such an approach may allow resource administrator 106 to manage a number of VDC resources that is greater than the maximum number of VDC resources permitted for utilization by a single virtual machine.

In some embodiments, VDC resources 124, 128, 136, 140 are at a plurality of different virtual data centers. For example, VDC resources 124 and 128 may be at a first virtual data center and VDC resources 136 and 140 may be at a different clouds service provider. Thus, manager 220 may manage and control VDC resources hosted by a plurality of different virtual data centers on behalf of client 210.

Service level agreement 230 may be an agreement between client 210 and manager 220 that indicate a particular storage service level to be provided to client 210. The service level agreement may indicate a threshold value or range of values that indicate acceptable levels of performance for performing resource utilization requests. The resource utilization requests may include requests to access data from, or save data to, VDC resources 124, 128, 136, 140. For example, the service level agreement may indicate that data operation requests received from client machine 110 at resource administrator 106 are to be completed at a median speed of 100 data operations per second and no slower than 50 data operations per second for an individual data operation. Service level agreement 230 may only be between client 210 and manager 220, and may not include any virtual data center.

Figure 3:
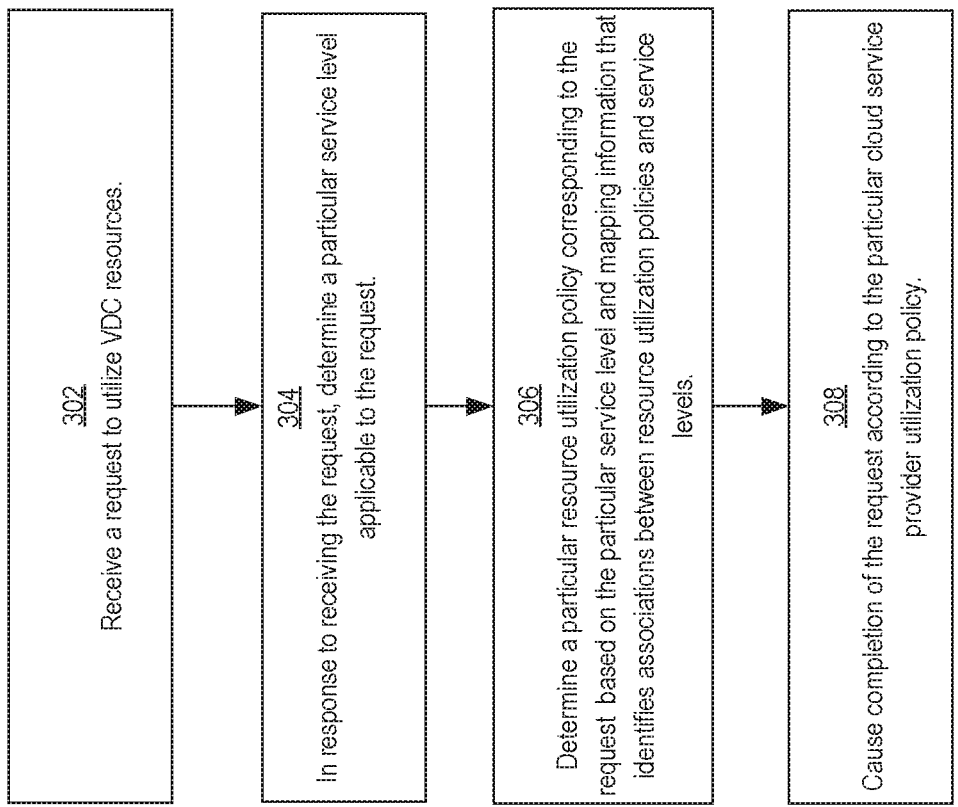
FIG. 3 illustrates an example method for storing data according to a determine resource utilization policy to meet the service level associated with the data.

FIG. 3 illustrates an example method for utilizing VDC resources according to a determined resource utilization policy to meet the service level associated with the request. The method of FIG. 3 may be implemented using one or more computer programs, other software elements, or other functional logic at resource administrator 106. At block 302, resource administrator 106 receives a VDC resource utilization request. The VDC resource utilization request may be a request to utilize VDC computing resources, to store data at VDC storage units, or to use cloud databases provided by the VDC, or some other VDC resource utilization request. The receiving and other portions of the process of FIG. 3 may be performed by executing resource administrator logic whose execution is controlled by a management entity different than the virtual data center. The request to store particular data may be received from client machine 100.

At block 304, in response to receiving the request to utilize VDC resources, resource administrator 106 determines a particular service level applicable to the request. The particular service level applicable to the request may be determined based on service level agreement 230. In an embodiment, client 210 specifies a service level that is applicable to all requests received at resource administrator 106 from client 210. In another embodiment, client 210 specifies a different service level for different types of VDC resource utilization requests. For example, client 210 may specify that requests to retrieve archived data from a VDC storage unit are to correspond to a "silver" service level, whereas requests to update client profile data at a VDC storage unit are to correspond to a "gold" service level. In another embodiment, client machine 100 sends a request to store data with a service level specification for the data. For example, client machine 100 may send a data storage request and specify that particular data is to correspond to a "gold" service level. In another embodiment, client 210 may specify a service level that is applicable to all requests, but client 210 may adjust the service level at different times. For example, client 210 may request a "platinum" service level for all data during peak season, and may request a "silver" service level for all data during off-peak season.

In an embodiment, service level agreement 230 is specified in concrete resource utilization terms, for example a particular number of operations per second. In an alternate embodiment, service level agreement 230 is specified in abstract and relative terms, for example "gold" "silver" or "bronze". Service level agreement 230 may include service level expectations for multiple discrete metrics, for example expected storage request response time versus expected storage request operations per second.

At block 306, resource administrator 106 determines a particular resource utilization policy corresponding to the request based on the particular service level and mapping information that identifies associations between resource utilization policies and service levels. Resource administrator 106 may determining the particular resource utilization policy that corresponds to the determined particular service level based on resource utilization policy mappings 108.

Examples of different resource utilization policies include changing data redundancy, mirroring or replication levels, data storage performance requirements, data storage striping policies (bit level, byte level, block level) changing from one RAID level to a different RAID level, selecting an alternative to RAID such as a particular erasure coding, or any other parameter relating to the reliability, availability, performance and capacity of a storage unit.

At block 308, resource administrator 106 causes completion of the request according to the particular VDC resource utilization policy. For example, resource administrator 106 may cause particular data to be stored in one or more storage units according to a particular storage policy. The particular storage policy may specify how the particular data is to be stored in one or more storage units. In an embodiment, the resourced utilization policy specifies the particular class of VDC resources to be utilized, such as the class of storage units that are to store the data. The class of VDC resources may be defined based on properties including, but not limited to, cost, the performance quality advertised by a VDC for the VDC resource, the type of physical hardware associated with the VDC resource, or the hosting virtual data center.

For example, a resource utilization policy may indicate that data associated with the resource storage policy is only to be stored on ELASTIC BLOCK STORAGE (EBS) offered by Amazon, Inc. Another resource utilization policy may indicate that data associated with the policy is to be stored on storage units that are advertised to have a retrieval delay rate of less than 6 milliseconds or cost less than a threshold amount. The advertised performance may be advertised by a virtual data center that provides the storage units. Another resource utilization policy may indicate that data associated with the resource utilization policy is only to be computed using computing resources that automatically perform load balancing.

In an embodiment, a resource utilization policy specifies that the data included in a write operation request corresponding to a particular policy is to be stored in the random-access memory of a system, such as a virtual machine. Data stored in random-access memory may allow data to be retrieved faster and therefore such a resource utilization policy may be associated with high priority data operation requests.

The resource utilization policies may specify a level of redundancy for storing data included in a resource utilization request storage data at VDC storage units. For example, the resource utilization policy may specify that copies of the same data are to be stored on at least three different storage units. The resource utilization policy may also specify that the different storage units, which each store a copy of the same data, must be determined to be hosted by least three different physical machines. The policy could specify RAID level such as RAID 6, RAID 5, or a particular erasure coding method such as Reed-Solomon coding, etc.

The resource utilization policy may indicate whether the corresponding data is to be striped over multiple storage units. Striping may include partitioning the data in the received data storage request and storing the data partition in separate storage units. The resource utilization policy may indicate how much data is to be included in each data partitions or how many storage units each portion of data is to be striped over. For example the resource utilization policy may indicate that 500 megabytes of data is to be striped over five different storage units or that each data partition is to include 100 megabytes of data. The resource utilization policy may indicate whether striping should be at the bit, byte, or block level.

The resource utilization policy may indicate whether to store parity information or the particular method for storing the parity information. For example, a resource utilization policy may indicate that data is to be striped over five storage units and one of the storage units is to be a dedicated parity storage unit. Parity also may be expressed in terms of RAID levels or erasure coding units.

Resource utilization policy mapping 108 may be determined by analyzing how storage policies affect performance criteria, such as speed and reliability. Resource utilization policy mapping 108 may be adjusted manually or automatically by an administrator, such as manager 220. Adjustments to resource utilization policy adjustment instructions 110 may be determined based on an analysis of various VDC resource utilization systems managed by different resource administrators at different virtual data centers.

Based on determined VDC resource performance information, resource utilization policy upgrader 116 may determine that actual performance of the set of VDC resources is not meeting performance expectations and thus data must be stored according to a different policy to ensure that service levels guaranteed to clients are met. Resource utilization policy upgrader 116 may modify resource utilization policy mappings 108 automatically or an administrator may manually modify resource utilization policy mappings 108.

Figure 4:
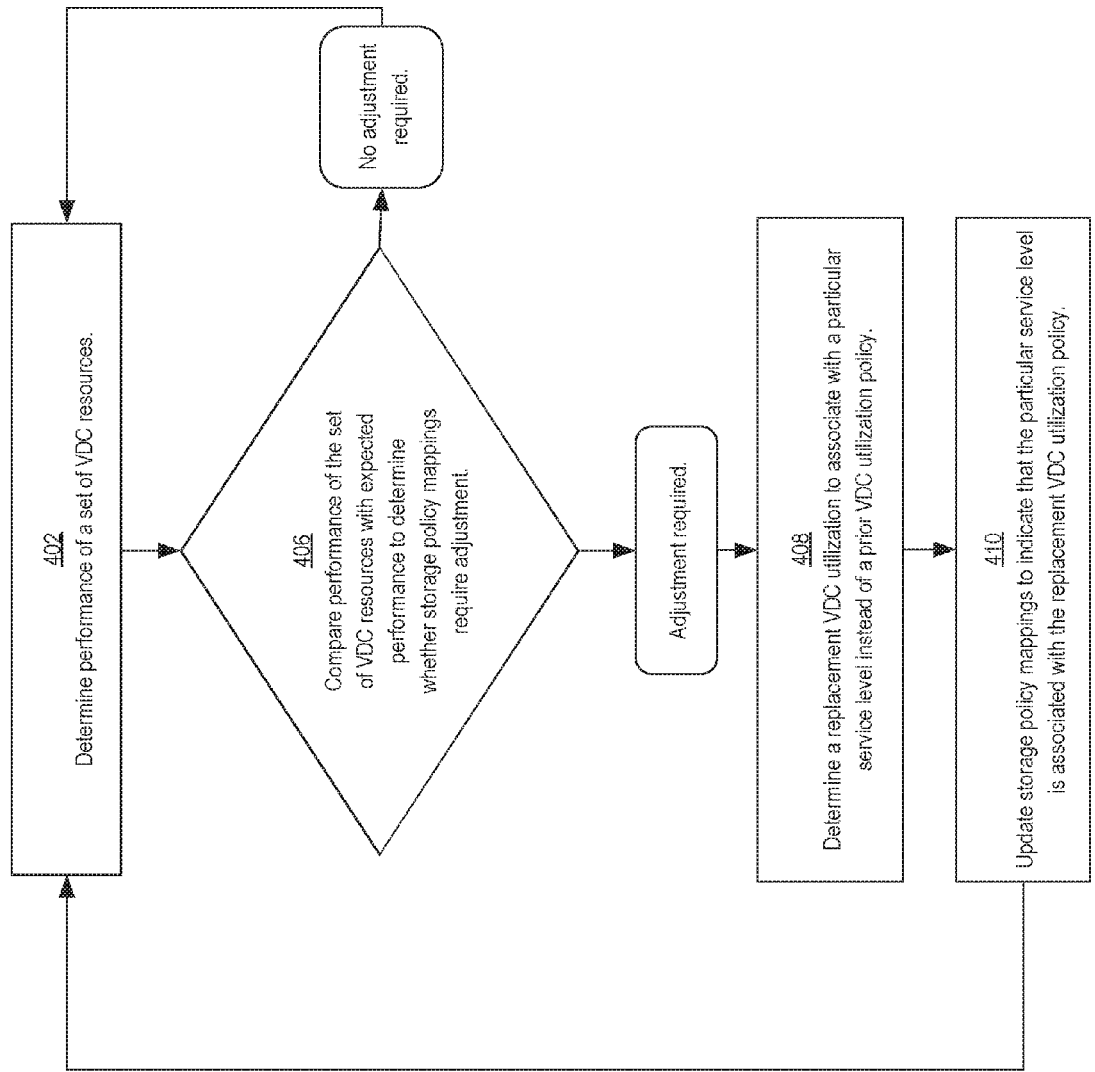
FIG. 4 illustrates an example method for automatically updating resource utilization policy mappings based on an analysis of the performance of a set of VDC resources.

FIG. 4 illustrates an example method for automatically updating resource utilization policy mappings based on an analysis of the performance of a set of VDC resources. The method of FIG. 4 may be implemented using one or more computer programs, other software elements, or other functional logic at resource utilization policy upgrader 116. At block 402, resource utilization policy upgrader 116 determines performance of a set of VDC resources. The determining and other portions of the process of FIG. 4 may be performed by executing resource administrator logic whose execution is controlled by a management entity different than the virtual data center.

The performance information may indicate a speed with which resource utilization requests are completed using the set of VDC resources and/or the reliability of the VDC resources. The performance information may indicate, for example, total access times for storing information in, or retrieving information from, a set of VDC storage units. The performance information may also include more specific information, such as the speed at which read requests are completed, the speed at which write requests are completed, or even more specifically, the speed at which random read operations are completed, or the speed at which random read operations are completed. As other examples, the performance information may indicate the speed at which a particular type of VDC computation request or VDC storage utilization request is completed.

VDC resource performance information may be directly observed by resource administrator 106. For example, resource administrator 106 may calculate the amount of time elapsed between the sending of a VDC resource utilization request to a resource manager or a VDC resource and the completion of the VDC resource utilization request.

The performance information may summarize performance characteristics of various VDC utilization requests observed over time. For example, the performance information may indicate a maximum, minimum, or median value of a performance characteristic within a particular period of time. For example, resource administrator 106 may determine that data operations using a particular set of storage units were completed at an average rate of 20 operations per second for a particular period of time. In other embodiments, the performance information may specify the performance of individual data operation requests.

At block 406, resource utilization policy upgrader 116 compares performance of the set of VDC resources with expected performance to determine whether resource utilization policy mappings require adjustment. At block 408, resource utilization policy upgrader 116 determines that an adjustment is required and determines a modification to a resource utilization policy associated with particular service level.

For example, data stored according to a particular storage policy may be expected to be retrieved at a median time of two milliseconds. In response to determining that the median data retrieval rate for data operation requests completed within the past hour is ten milliseconds, resource utilization policy upgrader 116 may determine that the particular storage policy is incompatible with the requested service level and a modification to the particular storage policy is required. At block 410, resource utilization policy upgrader 116 updates resource utilization policy mappings 108 to indicate that the particular service level is associated with the replacement resource utilization policy.

The particular set of VDC resources whose performance is analyzed to determine changes to one or more policy mappings may vary according to different embodiment. The analyzed set of VDC resources may be the same set of VDC resources to be utilized for the incoming VDC resource utilization request. In another embodiment, the analyzed VDC resources are different than the VDC resources to be utilized for storing data according to the updated policy, but belong to the VDC resource class and are hosted by the same virtual data center provider as the VDC resources to be utilized for the incoming resource utilization request. In another embodiment, the analyzed VDC resources belong to a different class but are hosted by the same virtual data center provider as the VDC resources utilized for the incoming resource utilization request.

For example, in response to determining that performance of storage units of a particular type hosted by a particular virtual data center provider is below expectations, resource utilization policy upgrader may modify resource utilization policies in resource utilization policy mappings 108 for all resource utilization policies that cause data to be stored in storage units of the particular type and hosted by the particular virtual data center provider.

Resource utilization policy adjustment instructions 110 may contain instructions for updating resource utilization policy mappings 108 based on determined performance conditions. For example, resource utilization policy adjustment instructions 110 may indicate that, in response to determining that actual data retrieval speed is between ten to twenty percent of the expected speeds for data stored according to a particular policy, a particular storage policy is to be modified by doubling the level of redundancy required by the particular storage policy.

Based on resource utilization policy adjustment instructions 110, resource utilization policy upgrader 116 may determine a replacement resource utilization policy that is the same as the particular resource utilization policy except that the second policy may indicate copies of the data is to be stored at a number of different storage units that is double the number of different storage units as indicated in the particular resource utilization policy.

According to various embodiments, resource utilization policy upgrader 116 may modify resource utilization policies in different ways based on different types of determined performance information. Resource utilization policy upgrader 116 may modify storage policies by causing data to be stored in different types of storage units, or may cause a greater portion of data to be stored in a particular type of storage unit.

For example, in response to determining that a data retrieval speed for a particular policy is ten percent of the expected speeds for data stored according to the particular policy, where the particular policy indicates that half of the data is to be stored in random-access memory and half of the data is to be stored in solid state drive (SSD) storage units, resource utilization policy upgrader 116 may determine a replacement storage policy, which indicates that all of the data is to be stored in random-access memory. Resource utilization policy upgrader 116 may request additional virtual machines from a virtual data center to utilize the random-access memory of the additional virtual machines.

In some embodiments, the replacement storage may increase the amount of parity information stored for each portion of data. For example, the replacement storage policy may require that parity information be stored on at least two different storage units for each portion of data, whereas the particular storage policy being replaced may only require that parity information be stored on a single storage unit for each portion of data. Resource utilization policy upgrader 116 may determine such a replacement storage policy based on a determination that data loss is occurring more frequently than expected for a particular storage policy.

In some embodiments, storage upgrader 116 may modify the resource utilization policy in response to determining that the performance of a set of VDC resources exceeds expectations for the set of VDC resources. For example, in response to determining that data retrieval exceed expected amount for data stored according to a particular policy, storage upgrader 116 may determine a replacement storage policy that requires less redundancy than the particular replaced policy. Such an approach may help to reduce VDC resource utilization costs.

In other embodiments, resource utilization policy upgrader 116 may modify a storage policy in other ways. For example, the replacement policy may require that data be striped over more or less storage units than required by a replaced resource utilization policy, or that the portion of data included in each stripe be less or more than required by a replaced storage policy.

As another example, in response to determining that a data computation speed for performing a particular type of data computation is five times longer than the expected speed for the particular set of computing resources, resource utilization policy upgrader 116 may determine a replacement computing resource utilization policy, which indicates that double the amount of computing resources are to be utilized for completing the particular type of data computation.

By updating the resource utilization policy mappings 108, resource utilization policy upgrader 116 may cause incoming resource utilization requests to be handled according to different resource utilization policies. Such an approach may be beneficial by allowing VDC resource utilization requests to be completed at the same level of performance despite variations in VDC resource performance, which often occur in the VDC environment.

At block 406, resource utilization policy upgrader 116 may compare performance of a set of VDC resources with expected performance to determine whether resource utilization policy mappings require adjustment and may determine that no adjustment is required. For example, storage upgrader 116 may determine that computing requests completed according to a particular computing resource policy are completed in accordance with expectations for the particular computing resource policy. As a result, resource utilization policy upgrader 116 may make no adjustments to the particular computing resource policy and may continue monitoring the performance of the set of VDC resources or other sets of VDC resources.

Figure 5:
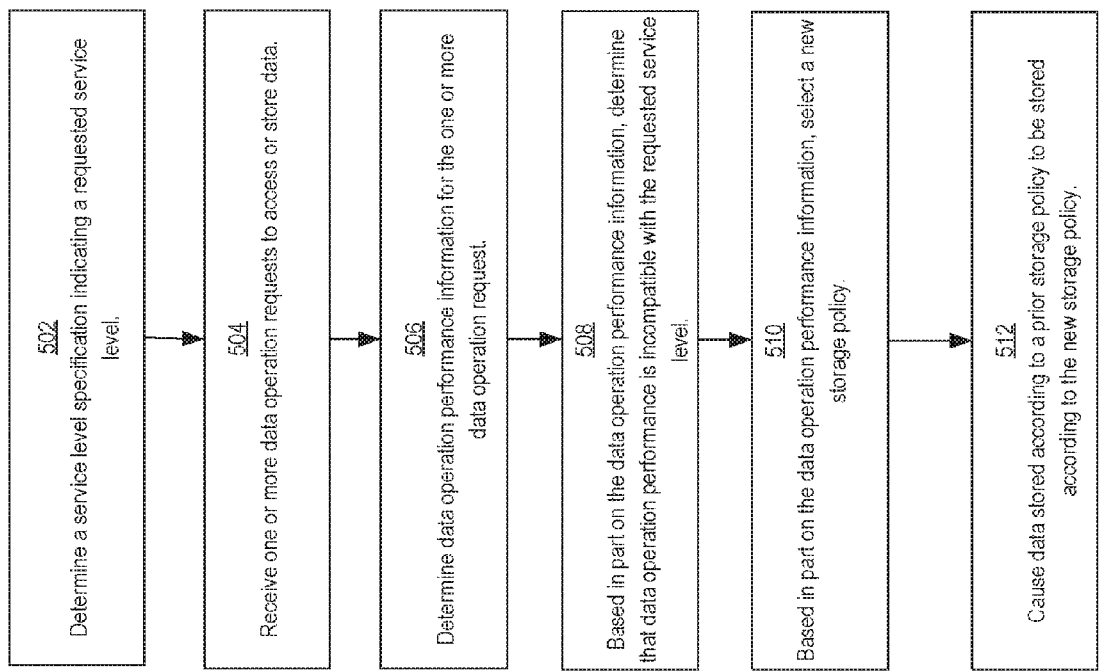
FIG. 5 illustrates an example method for storing data according to a new resource storage based on determine data operation performance information.

In some embodiments, storage policy manager 118 may cause data that has already been stored according to a particular storage policy to be stored according to a different storage policy based on determined storage unit performance information. FIG. 5 illustrates an example method for storing data according to a new storage policy based on determined data operation performance information.

The method of FIG. 5 may be implemented using one or more computer programs, other software elements, or other functional logic at storage policy manager 118. At block 502, storage policy manager 118 determines a service level specification indicating a requested service level. The determining and other portions of the process of FIG. 5 may be performed by executing resource administrator logic whose execution is controlled by a management entity different than the virtual data center provider.

The service level specification may be received from client machine 100 or determined based on service level agreement 230. The service level may be associated with a threshold value or range of values that indicate acceptable levels of performance for completing resource utilization requests.

At block 504, storage policy manager 118 receives one or more data operation requests to access or store data. At block 506, storage policy manager 118 determines data operation performance information for the one or more data operation request. The data operation performance information may indicate a speed with which resource utilization requests are completed using the set of VDC resources and/or the reliability of the VDC resources.

At block 508, based in part on the data operation performance information, storage policy manager 118 determines that the data operation performance is incompatible with the requested service level. For example, the observed median speed of the data operation performances may be below a threshold speed associated with the requested service level.

At block 510, based in part on the data operation performance information, storage policy manager 118 selects a new storage policy. Storage policy manager 118 may select a new storage policy based on resource utilization policy adjustment instructions 110.

Resource utilization policy adjustment instructions 110 may contain instructions for selecting a new storage policy based on determined storage unit performance conditions. For example, resource utilization policy adjustment instructions 110 may indicate that, in response to determining that actual data retrieval speed is between fifty to seventy percent of the expected speeds for data stored according to a particular policy, a particular storage policy is to be modified by striping the data over twenty percent more storage units. At block 512, storage policy manager 118 causes data stored according to a prior storage policy to be stored according to the new storage policy. Causing resource utilization requests to be completed according to a particular resource utilization policy may require requesting new VDC resources from the VDC on behalf of client 210. For example, storing data according to a particular policy may require requesting additional storage units of a particular type from the VDC on behalf of client 210.

In other embodiments, a data distribution agent may cause data that has already been distributed according to a particular resource utilization policy to be distributed according to a different resource utilization policy based on determined resource utilization performance information. Resource utilization performance information for one or more other types of resource utilization requests may be determined. Based in part on the resource utilization performance information, data distribution agent may determine that data operation performance information is incompatible with the requested service level. A new data distribution policy may be selected and data distributed according to a prior data distribution policy may be distributing according to the new data distribution policy.

The requests to utilize one or more virtual data center (VDC) resources may comprise requests to access or store data and the new resource utilization policy may be a storage policy. Requests to utilize one or more virtual data center (VDC) resources comprise requests to utilize one or more networking resources and the new resource utilization policy may be a networking policy. A particular networking policy may indicate network properties such as physical link choice, e.g. 10 gigabit ethernet for a higher cost, instead of 1 gigabit ethernet for a lower cost; physical placement and proximity, e.g. co-location on a rack to avoid network hops and improve bandwidth utilization; differentiated service and prioritization, e.g. adjustment to packet queuing policy to favor one application over another.

The requests to utilize one or more virtual data center (VDC) resources may comprise requests to utilize security resources and the new resource utilization policy may be a security policy. Security policies may indicate security properties, such as logical access controls, e.g. prohibit a class of users from transacting with a given application (regardless of its physical location); choice of encryption options, e.g. increased frequency of key rotation to reduce the window of opportunity of data leakage; frequency or depth of malware scanning, e.g. increased frequency with a higher catch rate.

The requests to utilize one or more virtual data center (VDC) resources may comprise requests to utilize virtual machines and the resource utilization policy may indicate a virtual machine utilization policy. Virtual machine utilization policies may indicate choice of computing resources, e.g. a higher number of virtual or physical processors for greater processing power at a higher price; amount of RAM to provision for a particular application; processor architecture and features, e.g. availability of advanced features such as encryption offloading or general purpose graphics processing units (GPGPUs) for high-performance computing.

3.0 Implementation Mechanisms—Hardware Overview

Figure 6:
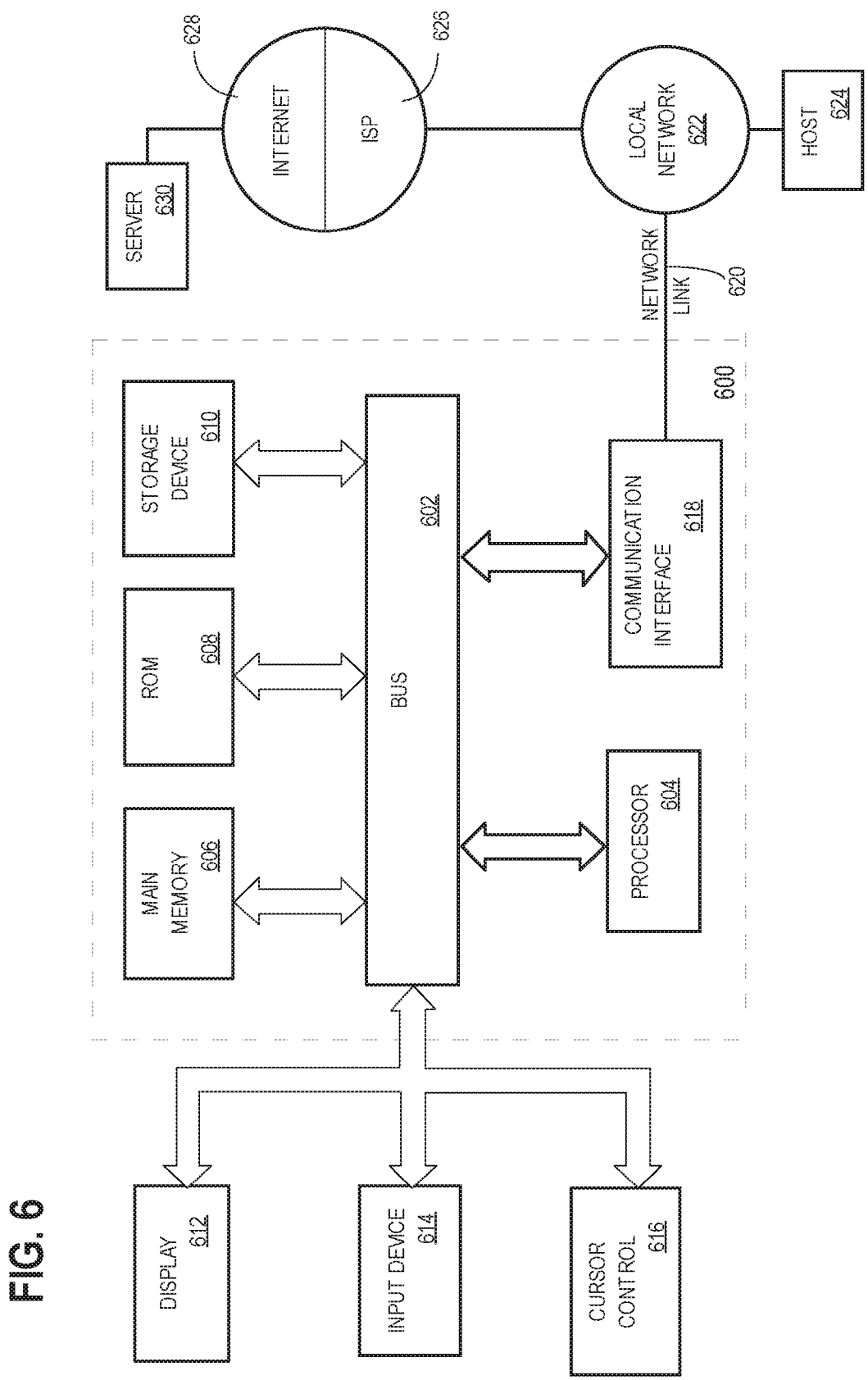
FIG. 6 illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 530 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

using resource administrator logic executed using a digital electronic computing device, receiving a request to utilize one or more virtual data center (VDC) security resources, wherein the VDC is remote with respect to the computing device;

in response to receiving the request, using the resource administrator logic executed using the computing device, determining a particular service level applicable to the request;

determining, using the resource administrator logic executed using the computing device, based on the particular service level and mapping information that indicates associations between VDC security policies and service levels, a particular VDC security policy corresponding to the request;

determining, using the resource administrator logic executed using the computing device, based on an analysis of one or more current security properties of the one or more of VDC security resources, that the particular VDC security policy associated with the particular service level is no longer compatible with a security protection provided by the one or more current security properties specified by the particular VDC security policy;

wherein the one or more current security properties specify at least one of: logical access control for transacting with one or more applications in the VDC, one or more encryption options for data stored in the VDC, or a frequency or depth of malware scanning;

modifying, using the resource administrator logic executed using the computing device, the mapping information to replace an identification of an association between the particular VDC security policy and the particular service level with an identification of an association between a new VDC security policy and the particular service level, wherein the new VDC security policy specifies one or more security properties that are different than the one or more current security properties;

causing completion of the request by utilizing the one or more security properties of VDC security resources associated with the particular service level;

wherein the method is performed by executing the resource administrator logic whose execution is controlled by a management entity that is different than a host of the VDC.

2. The method of claim 1, wherein the request to utilize the one or more VDC security resources is a request to store particular data and causing completion of the request to utilize the one or more VDC security resources comprises causing the particular data to be stored in one or more storage units according to the particular VDC security policy.

3. The method of claim 1, wherein the particular service level applicable to the request is based on an agreement between the management entity and a user other than the host of the virtual data center.

4. The method of claim 1, wherein the particular service level is associated with one or more threshold security property values that indicate acceptable security for the request and that the particular VDC security policy is determined to be compatible with the one or more threshold security properties.

5. The method of claim 1, wherein the particular VDC security policy indicates logical access control level that can prohibit one or more users from transacting with a given application.

6. The method of claim 1, wherein the particular VDC security policy indicates an encryption option.

7. The method of claim 6, wherein the encryption option indicates a frequency of encryption key rotation.

8. The method of claim 1, wherein the particular VDC security policy indicates a frequency or depth of malware scanning.

9. The method of claim 1, further comprising receiving, from a client computer, a service level specification indicating a desired service level before receiving the request.

10. A data processing method executed using a programmed computing device, and under control of a management entity that is different than a host of a plurality of virtual data center (VDC) security resources, and wherein the VDC is remote with respect to the computing device, the method comprising:

receiving a request to utilize one or more of the VDC security resources;

in response to receiving the request, determining a particular service level applicable to the request;

determining, based on the particular service level and mapping information that indicates associations between VDC security policies and service levels, a particular VDC security policy corresponding to the request, wherein the particular VDC security policy specifies one or more current security properties of VDC security resources to be utilized in completing the request, and wherein the particular VDC security policy indicates an encryption option, or indicates a frequency or depth of malware scanning;

causing completion of the request by utilizing one or more security properties of VDC security resources associated with the particular service level by:

determining, using a resource administrator logic executed using the computing device, based on an analysis of security properties of a set of VDC security resources, that the particular VDC security policy associated with the particular service level is no longer compatible with a security protection provided by the one or more current security properties of VDC security resources;

modifying, using the resource administrator logic executed using the computing device, the mapping information to replace an identification of an association between the particular VDC security policy and the particular service level with an identification of an association between a new VDC security policy and the particular service level, wherein the new VDC security policy specifies the one or more security properties of VDC security resources that are different than the one or more current security properties of VDC security resources.

11. The method of claim 10, wherein the request to utilize the one or more VDC security resources is a request to store particular data, and wherein causing completion of the request to utilize the one or more VDC security resources comprises causing the particular data to be stored in one or more storage units according to the particular VDC security policy.

12. The method of claim 10, wherein the particular service level is associated with one or more threshold security property values that indicate acceptable security for the request and that the particular VDC security policy is determined to be compatible with the one or more threshold security properties.

13. The method of claim 10, wherein the particular VDC security policy indicates logical access control level that can prohibit one or more users from transacting with a given application.

14. A data processing method comprising:
using a server, obtaining from one or more non-transitory computer-readable data storage media a copy of program code that are stored on the media and are arranged, when executed using a computer system among a plurality of other computer systems to cause the computer system to perform, using resource administrator logic:
receiving a request to utilize one or more virtual data center (VDC) security resources, wherein the VDC is remote with respect to the computing device,
in response to receiving the request, determining a particular service level applicable to the request,
determining, based on the particular service level and mapping information that indicates associations between VDC security policies and service levels, a particular VDC security policy corresponding to the request,
determining, using the resource administrator logic executed using the computing device, based on an analysis of one or more current security properties of the one or more VDC security resources, that the particular VDC security policy associated with the particular service level is no longer compatible with a security protection provided by the one or more current security properties specified by the particular VDC security policy,
wherein the one or more current security properties specify at least one of: logical access control for transacting with one or more applications in the VDC, one or more encryption options for data stored in the VDC, or a frequency or depth of malware scanning,
modifying, using the resource administrator logic executed using the computing device, the mapping information to replace an identification of an association between the particular VDC security policy and the particular service level with an identification of an association between a new VDC security policy and the particular service level, wherein the new VDC security policy specifies one or more security properties that are different than the one or more current security properties,
causing completion of the request by utilizing the one or more security properties of VDC security resources associated with the particular service level,
wherein the resource administrator logic is controlled by a management entity that is different than a host of the VDC;
using the server, downloading the copy of the program code to any of the other computers.

15. The method of claim 14, wherein the particular VDC security policy indicates logical access control level that can prohibit one or more users from transacting with a given application.

16. The method of claim 14, wherein the particular VDC security policy indicates an encryption option.

17. The method of claim 16, wherein the encryption option indicates a frequency of encryption key rotation.

18. The method of claim 14, wherein the particular VDC security policy indicates a frequency or depth of malware scanning.

* * * * *